United States Patent
Lee et al.

(10) Patent No.: US 11,727,172 B2
(45) Date of Patent: Aug. 15, 2023

(54) TUNING APPARATUS AND TUNING METHOD FOR CLUTCH TEMPERATURE ESTIMATION MODEL

(71) Applicants: HYUNDAI MOTOR COMPANY, Seoul (KR); KIA MOTORS CORPORATION, Seoul (KR)

(72) Inventors: Geontae Lee, Hwaseong-si (KR); Min Ki Kim, Hwaseong-si (KR); Kyoung Song, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 359 days.

(21) Appl. No.: 17/096,022

(22) Filed: Nov. 12, 2020

(65) Prior Publication Data
US 2021/0326496 A1    Oct. 21, 2021

(30) Foreign Application Priority Data
Apr. 17, 2020    (KR) .................. 10-2020-0046759

(51) Int. Cl.
  *G06F 30/20*    (2020.01)
  *G06F 119/08*   (2020.01)
  *G01K 13/00*    (2021.01)

(52) U.S. Cl.
  CPC .............. *G06F 30/20* (2020.01); *G01K 13/00* (2013.01); *G06F 2119/08* (2020.01)

(58) Field of Classification Search
  CPC ...... G06F 30/20; G06F 2119/08; G01K 13/00
  See application file for complete search history.

(56) References Cited

U.S. PATENT DOCUMENTS 6,405,122 B1 *    6/2002  Yamaguchi ......... F02D 41/1405
                                                706/31
2019/0391022 A1 * 12/2019  Higaki ............... H05K 7/20909

OTHER PUBLICATIONS

Pica G, Cervone C, Senatore A, Lupo M, Vasca F. Dry dual clutch torque model with temperature and slip speed effects. Intelligent Industrial Systems. Jun. 2016;2(2):133-47. (Year: 2016).*

* cited by examiner

*Primary Examiner* — Chuen-Meei Gan
(74) *Attorney, Agent, or Firm* — Lempia Summerfield Katz LLC

(57) ABSTRACT

A tuning method for a clutch temperature estimation model may include, generating n tuning genes, calculating a tuning value corresponding to a tuning variable by using information of each of the n tuning genes, calculating a temperature estimation accuracy by applying the calculated tuning value to the clutch temperature estimation model, extracting n tuning genes of highest calculated accuracies, and regenerating m tuning genes through recombination of the extracted n tuning genes.

15 Claims, 9 Drawing Sheets

Heat $E_{clutch}$ = QtrFC2 × Heat E    Heat $E_{flywheel}$ = (1 − QtrFC2) × Heat E QtrfC2 ↑, QtrfC2 ↓

FIG. 6

| Chromosome | 1 | 2 | 3 | 4 | 5 | 6 | 7 | 8 | 9 | 10 | 11 | 12 | 13 | 14 | 15 | 16 | 17 | Variable ||| 
|---|---|---|---|---|---|---|---|---|---|---|---|---|---|---|---|---|---|---|---|---|
| | QtrFC2 ||| | Cltch Trq Tune2 |||||| | Base HTC Tune ||||| | QtrFC2 | Cltch Trq Tune2 | Base HTC Tune |
| Conversion | 16 | 8 | 4 | 2 | 1 | 32 | 16 | 8 | 4 | 2 | 1 | 32 | 16 | 8 | 4 | 2 | 1 | | | |
| First | 0 | 1 | 1 | 0 | 1 | 1 | 0 | 0 | 0 | 0 | 0 | 1 | 0 | 1 | 1 | 0 | 1 | 0.52 | 0.92 | 0.75 |
| Second | 0 | 1 | 1 | 0 | 0 | 1 | 0 | 0 | 0 | 0 | 0 | 1 | 0 | 1 | 1 | 0 | 1 | 0.52 | 0.92 | 0.75 |
| Third | 0 | 1 | 1 | 0 | 0 | 1 | 0 | 0 | 0 | 0 | 0 | 1 | 0 | 1 | 1 | 0 | 1 | 0.52 | 0.92 | 0.75 |
| Fourth | 0 | 1 | 1 | 0 | 0 | 1 | 0 | 0 | 0 | 0 | 0 | 1 | 0 | 1 | 1 | 0 | 1 | 0.52 | 0.92 | 0.75 |
| Fifth | 0 | 1 | 1 | 0 | 0 | 1 | 0 | 0 | 0 | 0 | 0 | 1 | 0 | 1 | 1 | 0 | 0 | 0.52 | 0.92 | 0.75 |

| Chromosome | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Fifth gene | 0 | 1 | 1 | 0 | 0 | 1 | 0 | 0 | 0 | 0 | 0 | 1 | 0 | 1 | 1 | 0 | 0 |
| Eighth gene | 0 | 1 | 1 | 0 | 1 | 1 | 0 | 0 | 0 | 0 | 0 | 1 | 0 | 1 | 1 | 0 | 1 |
| Second gene | 0 | 1 | 1 | 0 | 0 | 1 | 0 | 0 | 0 | 0 | 0 | 1 | 0 | 1 | 1 | 1 | 0 |
| Fourth gene | 0 | 1 | 1 | 0 | 1 | 1 | 0 | 0 | 0 | 0 | 0 | 1 | 0 | 1 | 1 | 0 | 1 |
| New gene | 0 | 1 | 1 | 0 | 0 | 1 | 0 | 0 | 0 | 0 | 0 | 1 | 0 | 1 | 1 | 1 | 1 |
| Mutation probability reference | 0.309223 | 0.830701 | 0.015652 | 0.479302 | 0.191234 | 0.009683 | 0.372911 | 0.067754 | 0.190323 | 0.954920 | 0.545687 | 0.942039 | 0.169102 | 0.45923 | 0.195416 | 0.271755 | 0.009477 |
| Post-mutation gene | 0 | 1 | 1 | 0 | 1 | 0 | 0 | 0 | 0 | 0 | 0 | 1 | 0 | 1 | 0 | 1 | 0 |

RG1, RG2, RG3, RG4

TG5, TG6, TG7

TUNING APPARATUS AND TUNING METHOD FOR CLUTCH TEMPERATURE ESTIMATION MODEL

CROSS-REFERENCE TO RELATED APPLICATION

This application claims priority to and the benefit of Korean Patent Application No. 10-2020-0046759, filed on Apr. 17, 2020, the entire contents of which are incorporated herein by reference.

FIELD

The present disclosure relates to a tuning apparatus and tuning method for a clutch temperature estimation model.

BACKGROUND

The statements in this section merely provide background information related to the present disclosure and may not constitute prior art.

A temperature of a dry clutch may increase due to clutch friction, e.g., when a vehicle started to move. Particularly, the clutch temperature rises sharply due to a hard friction when the vehicle starts after stopping on a hill. When the clutch temperature rises, a friction coefficient characteristic of the clutch friction material may be deteriorated, and a driver may feel discomfort due to deterioration of starting acceleration.

In addition, when such a high temperature state of the clutch is continued or repeated, durability and/or shift-feel of the clutch may be deteriorated. Because the driver cannot easily recognize this problem, a clutch temperature warning is displayed on the cluster. The clutch temperature is typically calculated based on a clutch temperature model.

However, we have discovered that it takes a long time for assessment and tuning of the clutch temperature estimation model by applying the clutch temperature estimation model to an actual vehicle. In addition, and an accuracy of such a clutch temperature estimation model and also a time for tuning the clutch temperature estimation model may be highly dependent on capabilities or expertise of workers who performs the tuning.

The above information disclosed in this Background section is only for enhancement of understanding of the background of the present disclosure, and therefore it may contain information that does not form the prior art that is already known to a person of ordinary skill in the art.

SUMMARY

The present disclosure provides a method and an apparatus that reduces an average man-hour required for manual tuning of a temperature model, and extracts tuning values with high accuracies by quantifying the tuning accuracies.

An exemplary tuning method for a clutch temperature estimation model includes: generating, by a tuning value generation module, a plurality of tuning genes; calculating, by the tuning value generation module, a tuning value corresponding to a tuning variable by using information of each of the plurality of tuning genes; calculating, by an accuracy calculation module, a temperature estimation accuracy by applying the calculated tuning value to the clutch temperature estimation model; extracting, by the accuracy calculation module, a first number of tuning genes of highest calculated accuracies among the plurality of tuning genes; and regenerating, by a recombination module, a second number of tuning genes through recombination of the extracted first number of tuning genes.

In one form, the calculating of the tuning value, the calculating of the accuracies, and the extracting of the first number of tuning genes may be further performed for the regenerated second number of tuning genes.

The extracting of the first number of tuning genes may include extracting n tuning genes of highest accuracies from among n tuning genes with high accuracies in a previous generation and m tuning genes in a subsequent generation.

An exemplary turning method may further include determining whether a current generation is a final generation while increasing a number of generation by repeating the regenerating of the second number of tuning genes through recombination of the extracted first number of tuning genes, the calculating of the tuning value for the second number of tuning genes, the calculating of the accuracies for the second number of tuning genes, and the extracting of the first number of tuning genes for the second number of tuning genes, and when the current generation is the final generation, finishing the repeating operation and tuning the clutch temperature estimation model by a tuning variable value with a highest accuracy.

The regenerating of the second number of tuning genes may include randomly selecting a third number of tuning genes from the extracted first number of tuning genes, extracting a tuning gene component for a randomly assigned region for each of the third number of tuning genes, and generating a new tuning gene by combining the extracted tuning gene components in corresponding regions.

The regenerating of the second number of tuning genes may further includes regenerating a post-mutation tuning gene by setting a mutation probability for each chromosome in the new tuning gene.

In the regenerating of the second number of tuning genes, for each in a plurality of sub-tuning genes included in the first number of tuning genes, a mutation probability for a lower bit of a sub-tuning gene may be set higher, and a mutation probability for an upper bit of a sub-tuning gene may be set lower.

In the calculating of the accuracies, the accuracies may be calculated taking into account of accuracies of a pressure plate maximum temperature, a pressure plate cooling curve, a flywheel maximum temperature, and a flywheel cooling curve.

The calculating of the accuracies may include calculating an accuracy of the clutch temperature estimation model by multiplying an accuracy of the pressure plate maximum temperature, an accuracy of the pressure plate cooling curve, an accuracy of the flywheel maximum temperature, and an accuracy of the flywheel cooling curve and by multiplying a mode weight value.

An exemplary tuning apparatus for a clutch temperature estimation model include: a tuning value generation module configured to randomly generate a plurality of first generation tuning genes and to calculate a tuning value corresponding to a tuning variable by using information of each first generation tuning gene of the plurality of first generation tuning genes, an accuracy calculation module configured to apply the calculated tuning value to the clutch temperature estimation model, calculate an accuracy of temperature estimation, and extract tuning genes of highest calculated accuracies among the plurality of first generation tuning genes, and a recombination module configured to regenerate second generation tuning genes by recombining the extracted first generation tuning genes.

The tuning value generation module may calculate the tuning value for the second generation tuning genes. The accuracy calculation module may apply the calculated tuning value for the second generation tuning genes to the clutch temperature estimation model, calculate the accuracy of temperature estimation, and extract third generation tuning genes with highest accuracies from among the first generation tuning genes and the second generation tuning genes.

The recombination module may recombine the third generation tuning genes to regenerate fourth generation tuning genes.

The recombination module randomly may select a number of tuning genes from the extracted first generation tuning genes, extract a tuning gene component for a randomly assigned region for each of the randomly selected number of tuning genes, and generate a new tuning gene by combining the extracted tuning gene components in corresponding regions.

The recombination module may regenerate a post-mutation tuning gene by setting a mutation probability for each chromosome in the new tuning gene.

For each in a plurality of sub-tuning genes included in the first generation tuning genes, a mutation probability for a lower bit of a sub-tuning gene may be set higher, and a mutation probability for an upper bit of a sub-tuning gene may be set lower.

The accuracy calculation module may calculate the tuning accuracies taking into account of accuracies of a pressure plate maximum temperature, a pressure plate cooling curve, a flywheel maximum temperature, and a flywheel cooling curve.

The accuracy calculation module may calculate an accuracy of the clutch temperature estimation model by multiplying an accuracy of the pressure plate maximum temperature, an accuracy of the pressure plate cooling curve, an accuracy of the flywheel maximum temperature, and an accuracy of the flywheel cooling curve and by multiplying a mode weight value.

According to tuning apparatus and tuning method for a clutch temperature estimation model according to an exemplary form, automatic tuning is realized by using a genetic algorithm, thereby significantly reducing man-hours required for tuning and increasing a tuning accuracy.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a table representing first generation tuning genes.

FIG. 7 illustrates generation of second generation tuning genes.

Figure 1:
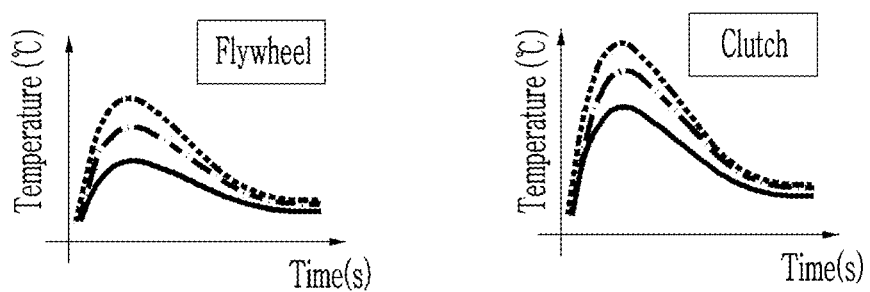
FIG. 1 to FIG. 3 are graphs illustrating a temperature change due to heat generated between a flywheel and a clutch over time.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary forms of the present specification, when it is determined that a detailed description of the well-known art associated with the present disclosure may obscure the gist of the present disclosure, it will be omitted. The accompanying drawings are provided only in order to allow exemplary forms disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

First, tuning of a clutch temperature estimation model tuning will be explained.

Figure 2:
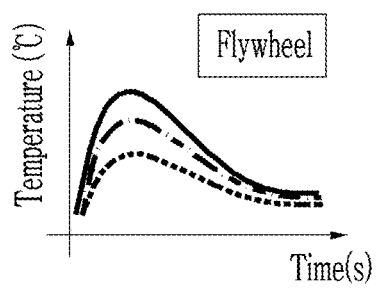
Figure 2:
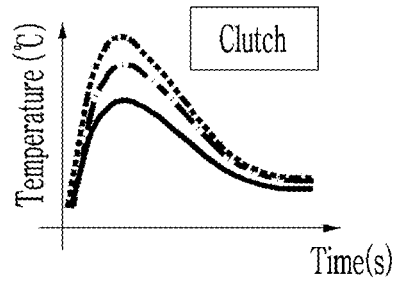
Figure 3:
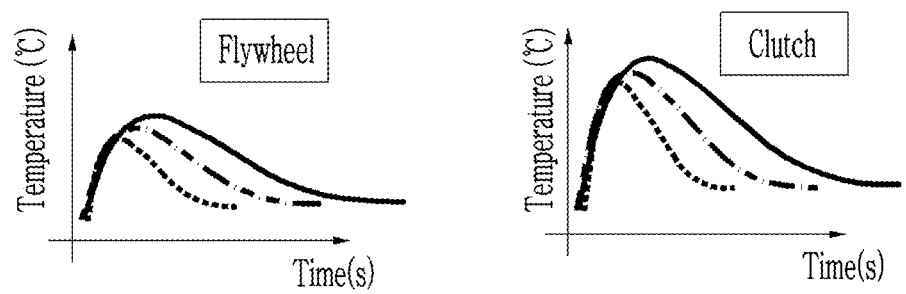

FIG. 1 to FIG. 3 are graphs illustrating a temperature change due to heat generated between a flywheel and a clutch over time.

The basic principle of the clutch temperature model is to set the heat generated during clutch slip as an energy source.

It is desired to tune how much energy is distributed to the flywheel-clutch parts. In addition, a cooling coefficient is set and tuning is performed to determine whether the cooled temperature of the clutch/flywheel matches the assessment result during cooling.

As shown in FIG. 1, ClutchTrqTune2 means a flywheel torque compensation value, and is a variable to tune when an overall temperature of the flywheel and/or the clutch is high or low. The actual heat energy is calculated by multiplying a flywheel torque by the coefficient of ClutchTrqTune2. FIG. As the dotted line of 1 increases, the value of ClutchTrqTune2 increases such that the heating energy increases, so the flywheel/clutch temperature rises than the flywheel/clutch temperature based on the single-dot chain line. As in the solid line of 1, when the value of ClutchTrqTune2 decreases, the heat energy decreases as much, so the flywheel/clutch temperature is lower than the flywheel/clutch temperature based on the single-dot chain line.

Referring to the dotted lines in FIG. 1, the heat energy increases when the value of ClutchTrqTune2 increases, and therefore, the flywheel/clutch temperature becomes higher than a reference of the flywheel/clutch temperature shown in the single-dot chain lines. Referring to the solid lines in FIG. 1, the heat energy decreases when the value of ClutchTrqTune2 decreases, and therefore, the flywheel/clutch temperature becomes lower than the reference of the flywheel/clutch temperature shown in the single-dot chain lines.

As shown in FIG. 2, QtrfC2 is a variable that determines how much heat energy generated during clutch heating is distributed to each part. When the QtfC2 is high, since the heat energy is more distributed to the clutch part, the temperature rises over the reference (single-dot chain line) as shown as the dotted line in the graph shown on the right in FIG. 2. In addition, since the heat energy is less distributed to the flywheel side, the flywheel side receives less heat energy and the temperature drops lower than the reference (single-dot chain line), as shown as the dotted line in the graph on the left in FIG. 2. When the QtfC2 is low, since the heat energy is less distributed to the clutch part, the temperature drops lower than the reference (single-dot chain line) as shown as the solid line in the graph shown on the right in FIG. 2. In addition, since the heat energy is more distributed to the flywheel side, the flywheel side receives more heat energy and the temperature increases over the reference (single-dot chain line), as shown as the solid line in the graph shown on the left in FIG. 2.

Referring to FIG. 3, BaseHTCTune is a variable to adjust a clutch cooling amount, and the value of BaseHTCTune is increased, the temperature drop at the clutch cooling may increase. ReD means a Reynolds Number at each radius and may be calculated as a multiplication of an AIRNU (e.g., 62914.41), engine speed*DCTR (effective radius of a clutch housing), and "DCTR*π(pi)*2". For an assessment, a temperature trend is monitored while cooling the clutch after reaching a maximum temperature, and the tuning is mainly related to a time region after reaching the maximum temperature. However, when the value of BaseHTCTune is increased, the cooling amount is increased as the dotted line shown in FIG. 3, and the maximum temperature becomes lower than the reference (single-dot chain line). To the contrary, when the value is decreased, the cooling amount is decreased as the solid line shown in FIG. 3, and the maximum temperature becomes higher than the reference (single-dot chain line). Therefore, such an influence should be considered in tuning. When the three major tuning variables is combined, there may be a very large number of cases, and it is not easy to tune manually by considering the influence of each variable.

At an initial tuning, tuning variables QtrfC2, cItchTrqTune2, BaseHTCTune are randomly generated. The random generation of the tuning variables may vary depending on the type of a transmission. For example, for an intelligent manual transmission (iMT) and automated manual transmission (AMT), QtrfC2, cItchTrqTune2, and BaseHTCTune may be set as tuning variables, and for a dual clutch transmission (DCT), QtrfC1 and CltchTrqTune1 may be added to tuning variables, considering the structure of the clutch.

Figure 4:
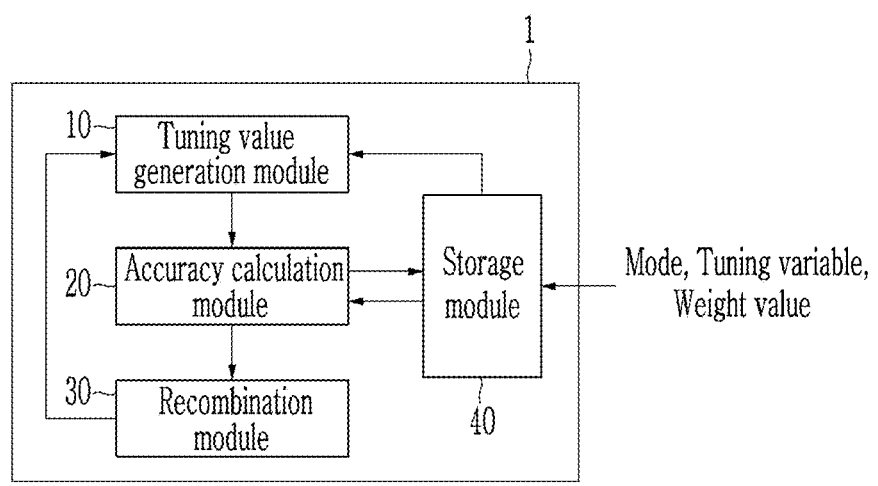
FIG. 4 shows a tuning apparatus for a clutch temperature estimation model according to an exemplary form.

FIG. 4 shows a tuning apparatus for a clutch temperature estimation model according to an exemplary form.

Figure 5:
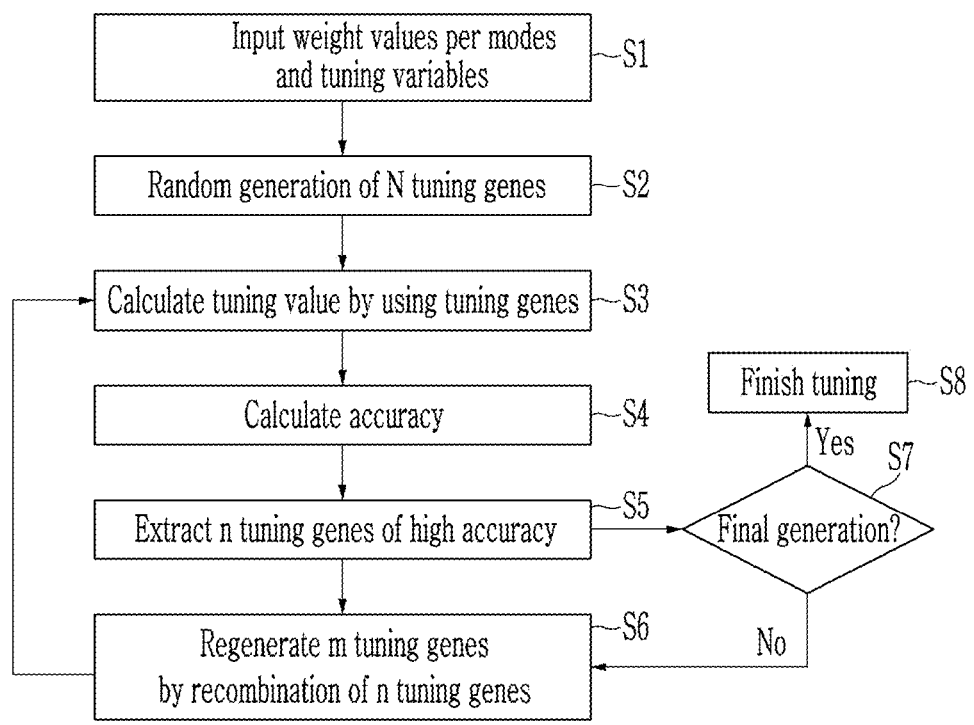
FIG. 5 is a flowchart showing a tuning method for a clutch temperature estimation model according to an exemplary form.

FIG. 5 is a flowchart showing a tuning method for a clutch temperature estimation model according to an exemplary form.

As shown in FIG. 4, a tuning apparatus 1 includes a tuning value generation module 10, an accuracy calculation module 20, a recombination module 30, and a storage module 40.

The tuning apparatus 1 according to an exemplary form utilizes a genetic algorithm, and may perform or include the following steps.

At step S1, the tuning value generation module 10 receives weight values for each mode and tuning variable. The input information may be stored in the storage module 40.

After data input for each mode is finished, at step S2, the tuning value generation module 10 randomly generates n tuning genes.

At step S3, the tuning value generation module 10 uses the information of each tuning gene to calculate the tuning value corresponding to the tuning variable. At this time, a predetermined number of tuning variables are selected among whole tuning variables, and the tuning value for the selected tuning variable may be calculated at the step S3.

At step S4, the accuracy calculation module 20 applies the calculated tuning value to the clutch temperature estimation model to calculate a maximum temperature difference and a cooling curve area difference, and calculates an accuracy of an estimated temperature through the clutch temperature estimation model by using the calculation result.

At step S5, the accuracy calculation module 20 extracts n tuning genes (e.g., 10 genes), in the order of high accuracy.

At step S6, the recombination module 30 recombines the extracted n tuning genes to regenerate m tuning genes (e.g., 30 tuning genes) S6.

Subsequently, the steps S3, S4, and S5 are performed for m tuning genes (second generation completed).

The step S5 may be performed on n tuning genes with high accuracy in the previous generation (i-th generation) and m tuning genes in the current generation (i+1-th generation). That is, the accuracy of the clutch temperature estimation model is calculated using n tuning genes in the first generation and m tuning genes in the second generation, and tuning genes with highest n accuracies are extracted from the totally n+m tuning genes.

As such, by repeating the steps S3 to S6, the number of generations is increased (first generation, second generation, third generation, . . . , and final generation). In addition, after performing the step S5, it is determined, at step S7, whether the current generation is a final generation. When the current generation is final generation (S7-Yes), the steps S3-S6 are not further repeated and the tuning is finished at step S8, and the clutch temperature estimation model may be tuned with the tuning variable having the highest accuracy in the final generation.

Subsequently, referring to FIG. 6, variable generation method using genetic algorithm according to an exemplary form will be described. Hereinafter, an exemplary form takes an example of three tuning variables. However, the number of tuning variables may be changed depending on the design.

FIG. 6 is a table representing first generation tuning genes.

For example, as shown in FIG. 6, the tuning genes generated at the step S2 include totally 17 chromosomes. The number 17 of the chromosome are exemplary, and may be varied depending on the design. The tuning gene may be expressed in binary. Among the 17 chromosomes included in the tuning gene, chromosomes 1 to 5 represent a tuning value for QtrfC2, chromosomes 6 to 11 represent a tuning value for CltchTrqTune2, and chromosomes 12 to 17 represent a tuning value for BaseHTCTune. However, the present disclosure is not limited thereto, and how many chromosomes at which positions among entire chromosomes may be varied depending on deigns. Hereinafter, a plurality of chromosomes representing a tuning value is collectively referred to a sub-tuning gene.

A first sub-tuning gene TG1 includes chromosomes 1 to 5. The first sub-tuning gene TG1 may have a tuning value based on a value in a decimal number converted according to the binary number corresponding to each chromosome in chromosomes 1 to 5. For example, in the first row, when chromosomes 1 to 5 are 01100, the conversion value is $0*2^4+1*2^3+1*2^2+0*2^1+0*2^0=12$, and the tuning value of QtrfC2 may be determined as 0.01*12+0.4=0.52 (final value) after the final conversion. The weight value 0.01 multiplied to the conversion value 12 and the constant 0.4 added to weight value*conversion value for obtaining the final value may be varied depending on design factors.

A second sub-tuning gene TG2 includes chromosomes 6 to 11. The second sub-tuning gene TG2may have a tuning value based on a value in a decimal number converted according to the binary number corresponding to each chromosome in chromosomes 6 to 11. For example, in the first row, when chromosomes 6 to 11 are 100000, the conversion value is $1*2^5+0*2^4+0*2^3+0*2^2+0*2^1+0*2^0=32$, and the tuning value of CltchTrqTune2 may be determined as 0.01*32+0.6=0.92 (final value) after the final conversion. The weight value 0.01 multiplied to the conversion value 32 and the constant 0.6 added to weight value*conversion value for obtaining the final value may be varied depending on design factors.

The third sub-tuning gene TG3 includes chromosomes 12 to 17,

The third sub-tuning gene TG3may have a tuning value based on a value in a decimal number converted according to the binary number corresponding to each chromosome in chromosomes 12 to 17. For example, in the first row, when chromosomes 12 to 17 are 101101, the conversion value is $1*2^5+0*2^4+1*2^3+1*2^2+0*2^1+1*2^0=45$, and the tuning value of BaseHTCTune may be determined as 0.01*45+0.3=0.75 (final value) after the final conversion. The weight value 0.01 multiplied to the conversion value 32 and the constant 0.4 added to weight value*conversion value for obtaining the final value may be varied depending on design factors.

In the above method, totally n tuning genes are randomly generated in the first generation, and tuning values for the respective tuning variables QtrfC2, CltchTrqTune2, and BaseHTCTune are calculated according to respective tuning genes (N is a natural number).

A clutch temperature estimation model is assessed according to such calculated N sets of tuning variables QtrfC2, CltchTrqTune2, and BaseHTCTune, to extract n tuning genes with high tuning accuracy among the tuning accuracy for N sets are extracted (n is a natural number). Tuning genes of a second generation may be made through gene crossing of the extracted n tuning genes. That is, new second generation tuning genes are made by combining n pieces with high accuracy from the first generation tuning genes. An example of a combination method is as follows.

Step-1) The recombination module 30 randomly selects k pieces from n pieces with high accuracy among first generation tuning genes. However, all k first generation tuning genes must be different from one another.

Step-2) The recombination module 30 randomly assigns a predetermined region for each of the k first generation tuning genes, and extracts the tuning gene of the allocated region.

Step-3) The recombination module 30 creates a tuning gene by combining the extracted tuning gene corresponding to each region.

Step-4) The recombination module 30 regenerates a post-mutation tuning gene by setting a mutation probability for each chromosome in this tuning gene. At this time, the mutation probability for the lower bit of the sub-tuning gene of the first generation tuning genes may be set higher and the mutation probability for the upper bit may be set lower. For example, mutation probabilities for 3rd, 4-th, 5-th, 9-th, 10-th, 11-th, 15-th, 16-th, and 17-th chromosomes corresponding to $2^2$, $2^1$, and $2^0$ of each sub-tuning gene of the first generation tuning genes may be set to 20%, and mutation probability for remaining chromosomes may be set to 2%.

The recombination module 30 repeats the step-1 to step-4 to generate m second generation tuning genes.

The tuning value generation module 10 calculates a tuning value for each of the tuning variables QtrfC2, CltchTrqTune2, and BaseHTCTune according to m second generation tuning genes. The accuracy calculation module 20 assesses the clutch temperature estimation model according to such calculated m sets of tuning variables QtrfC2, CltchTrqTune2, and BaseHTCTune.

The accuracy calculation module 20 extracts n sets with high accuracies among tuning accuracies for m sets according to the second generation tuning genes and upper n tuning accuracies according to the first generation tuning genes. Tuning accuracies according to remaining tuning gene other than the n tuning genes corresponding to upper n tuning accuracies are stored in the storage module 40, and may be utilized later when tuning accuracy according to the same tuning gene is required. For example, the accuracy calculation module 20 may use the tuning accuracy stored in the storage module 40 when the new tuning gene generated by the recombination module 30 is the same with the previously generated tuning gene.

FIG. 7 illustrates generation of second generation tuning genes.

Firstly, second, fourth, fifth, and eighth tuning genes are selected from n genes with high accuracy among first generation tuning genes.

For each of the four first generation tuning genes, a predetermined region is randomly assigned, and a tuning gene component for the assigned region is extracted. For example, chromosome numbers 1 to 8 in RG1 "01100100" of fifth tuning gene, chromosome numbers 9 to 10 in RG2 "00" of eighth tuning gene, chromosome numbers 11 to 16 in RG3 "010111" of fourth tuning gene, and chromosome number 17 in RG4 "1" of the fourth tuning gene are extracted.

Subsequently, a new tuning gene "01100100000101111" is created by combining extracted genes corresponding to the respective regions.

A gene mutated from the new turning gene according to predetermined mutation probabilities for respective chromosomes is created. The mutation within a gene shown in FIG. 7 helps to find a tuning value with new information that does not exist in the tuning gene created so far, although it has a low probability. Regarding sub-tuning genes (first to fifth chromosomes, sixth to eleventh chromosomes, and twelfth to seventeenth chromosomes) of the first generation tuning genes shown in FIG. 7, the mutation probability for chromosomes corresponding lowest 3 bits $2^2$, $2^1$, $2^0$, i.e., third to fifth chromosomes, ninth to eleventh chromosomes, and twelfth to seventeenth chromosomes, is set to 20%, and the mutation probability for remaining chromosomes is set to 2%. For each chromosome of the new tuning gene, the mutation occurs when the mutation probability is lower than a predetermined mutation probability reference, and the mutation does not occur otherwise.

For example, the predetermined mutation probability reference of the third chromosome is 20%, and in this case, since the mutation probability of 0.015652 is lower than 20%, a mutation occurs in the third chromosome to change from "1" to "0". Mutation occurs in the fifth, sixth, ninth, fifteenth, and seventeenth chromosomes in the same way as above, changing from "1" to "0" or vice versa.

In this way, m second generation tuning genes are generated. The tuning value generation module 10 calculates tuning values for tuning variables QtrfC2, CltchTrqTune2, and BaseHTCTune according to three sub-tuning gene TG5, TG6, and TG7 of the m second generation tuning genes.

The accuracy calculation module 20 may calculate accuracy in consideration of variables such as a pressure plate (PP) maximum temperature, a pressure plate (PP) cooling curve, a flywheel (CP) maximum temperature, and a flywheel (CP) cooling curve.

The method to calculate the accuracy for each variable is as follows.

The accuracy of the PP maximum temperature is based on the result of comparing the PP maximum temperature estimated by the temperature estimation model with a highest PP temperature among actual PP temperature data. As an example, the accuracy of the PP maximum temperature may be calculated as 1−absolute value{(the PP maximum temperature of the temperature estimation model−actual PP maximum temperature)/(actual PP maximum temperature)}.

The accuracy of the PP cooling curve is based on an area at the PP temperature graph when cooling after the actual PP maximum temperature and an area at a temperature graph when cooling after the PP maximum temperature of the temperature estimation model As an example, the accuracy of the PP cooling curve may be calculated as "1−{Σabsolute value(area of PP temperature graph at temperature estimation model cooling−actual PP temperature graph area at temperature cooling)}/(area of actual PP temperature graph at temperature cooling)}".

The accuracy of the CP maximum temperature is based on the result of comparing the CP maximum temperature estimated by the temperature estimation model with a highest CP temperature among actual CP temperature data. As an example, the accuracy of the CP maximum temperature may be calculated as 1−absolute value{(CP maximum temperature of the temperature estimation model−actual CP maximum temperature)/(actual CP maximum temperature)}.

The accuracy of the CP cooling curve is based on an area at the CP temperature graph when cooling after the actual CP maximum temperature and an area at a temperature graph when cooling after the CP maximum temperature of the temperature estimation model As an example, the accuracy of the CP cooling curve may be calculated as "1−{Σabsolute value(area of CP temperature graph at temperature estimation model cooling−actual CP temperature graph area at temperature cooling)}/(area of actual CP temperature graph at temperature cooling)}".

The accuracy calculation module 20 may calculate a final accuracy by multiplying weight values for each of the PP maximum temperature, the PP cooling curve, the CP maximum temperature, and the CP cooling curve to the calculated accuracy, and by multiplying the mode weight value. The weight value and mode weight value for each variable may be input through a user interface.

The mode weight value means a weight value according to a mode defined depending on driving conditions. For example, the driving conditions may be defined in various schemes depending on design factors based on a level of heat generated by a clutch, a cooling method, and a driving environment of the vehicle, etc. The mode weight value means a weight value assigned to each mode.

Figure 8:
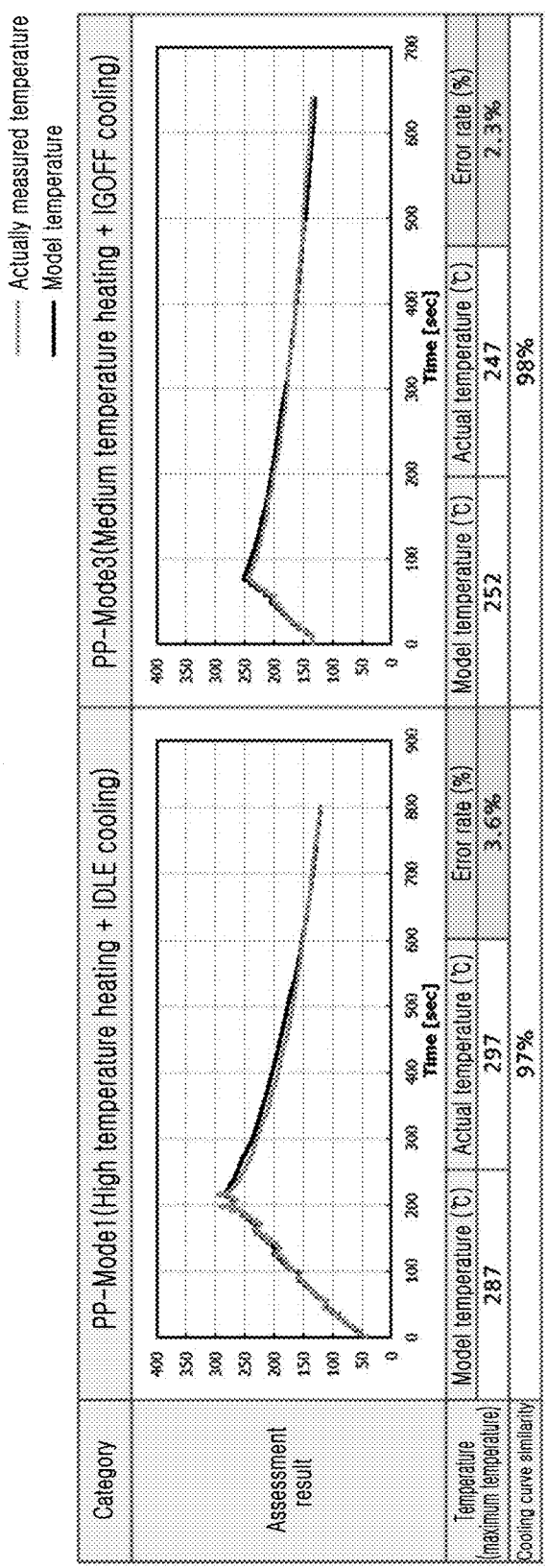
FIG. 8 and FIG. 9 is a graph showing an estimated temperature and an actual measure temperature according to the temperature estimation model for each mode for a pressure plate.
Figure 9:
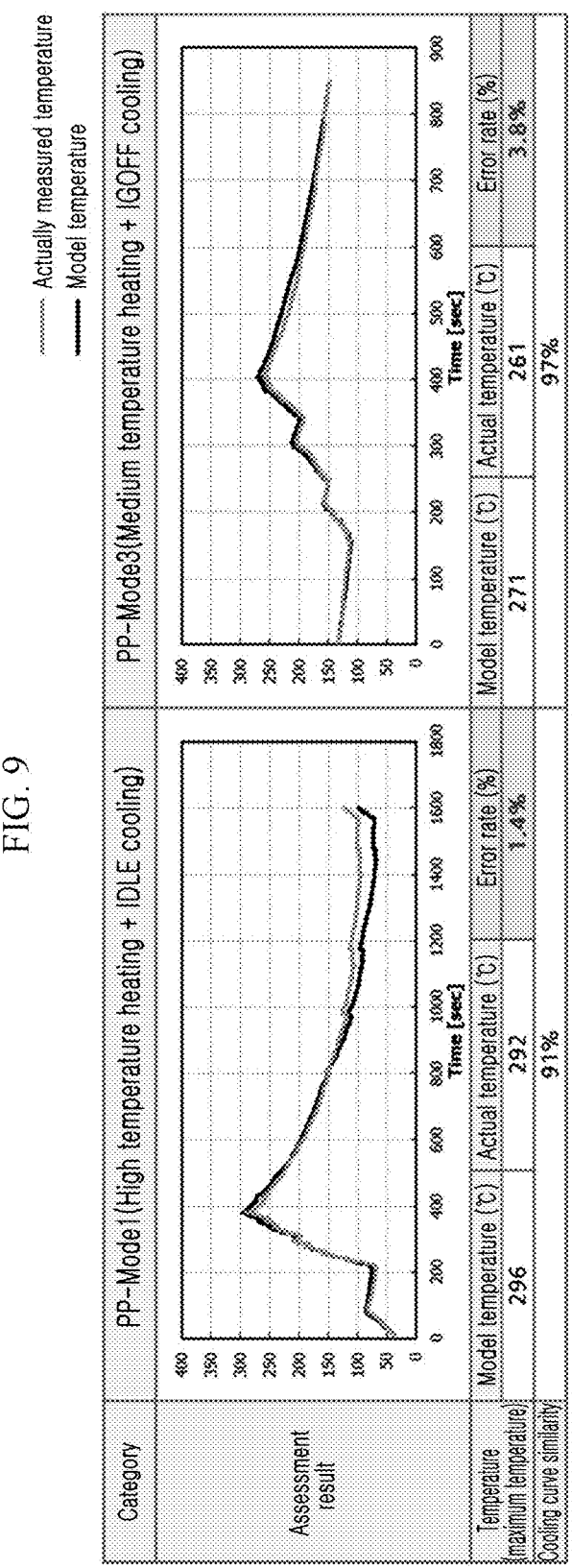

FIG. 8 and FIG. 9 is a graph showing an estimated temperature and an actual measure temperature according to the temperature estimation model for each mode for a pressure plate.

As shown in FIG. 8 and FIG. 9, clutch temperature estimation model according to an exemplary form is tuned, such that two temperature graphs are very similar to show very small error rate between the two graphs.

Conventional clutch temperature model assessment process includes, installation of a temperature sensor in a vehicle transmission or a clutch, vehicle assessment and data measurement for each mode, tuning in a data sheet, e.g., in an excel file, for temperature model after a data conversion, vehicle reassessment after tuning variable input, and determining whether an additional tuning is required. In the case of using an excel file applied with same equation(s) with vehicle temperature model for tuning the temperature model, it takes typically more than 10 seconds for calculation of one mode for one tuning value. If the tuning variables are input and there are nine modes, totally nine excel sheet is required. Therefore, at least 90 seconds (one minute and thirty seconds) is required for tuning a single variable, and if the time for comparison and analysis is taken into account, almost 5 minutes are required per each variable. Therefore, if the variable is changed 10 times for tuning, it takes about 1 hour for tuning a single variable according to the same process. In addition, a difference in tuning time and accuracy may be caused depending on the expertise of the tuning person.

As such, according to tuning apparatus and tuning method for a clutch temperature estimation model according to an exemplary form, automatic tuning is realized by using a genetic algorithm, thereby significantly reducing man-hours required for tuning and increasing a tuning accuracy.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

DESCRIPTION OF SYMBOLS

1: tuning apparatus
10: tuning value generation module
20: accuracy calculation module
30: recombination module
40: storage module

What is claimed is:

1. An automatically tuning method without user interference for a clutch temperature estimation model, the tuning method comprising:
    generating, by a tuning value generation module, a plurality of tuning genes;
    calculating, by the tuning value generation module, a tuning value corresponding to a tuning variable by using information of each tuning gene of the plurality of tuning genes;
    calculating, by an accuracy calculation module, a temperature estimation accuracy by applying the calculated tuning value to the clutch temperature estimation model;
    extracting, by the accuracy calculation module, a first number of tuning genes having highest calculated accuracies among the plurality of tuning genes;
    and regenerating, by a recombination module, a second number of tuning genes through recombination of the extracted first number of tuning genes with highest tuning accuracy,
    wherein
    regenerating the second number of tuning genes comprises:
        randomly selecting a third number of tuning genes from the extracted first number of tuning genes;
        extracting a tuning gene component for a randomly assigned region for each tuning gene of the third number of tuning genes; and
        generating a new tuning gene by combining the extracted tuning gene components in corresponding regions.

2. The tuning method of claim 1, wherein calculating a tuning value, calculating temperature estimation accuracies, and extracting the first number of tuning genes are further performed for the regenerated second number of tuning genes.

3. The tuning method of claim 2, wherein extracting the first number of tuning genes comprises extracting tuning genes with highest accuracies among tuning genes with high accuracies in a previous generation and tuning genes in a subsequent generation.

4. The tuning method of claim 2, further comprising:
    determining whether a current generation is a final generation while increasing a number of generation by repeating the regenerating of the second number of tuning genes through recombination of the extracted first number of tuning genes, the calculating of the tuning value for the second number of tuning genes, the calculating of the accuracies for the second number of tuning genes, and the extracting of the first number of tuning genes for the second number of tuning genes; and
    when a current generation is a final generation, finishing the repeating operation and tuning the clutch temperature estimation model by a tuning variable value with a highest accuracy.

5. The tuning method of claim 1, wherein regenerating the second number of tuning genes further comprises regenerating a post-mutation tuning gene by setting a mutation probability for each chromosome in the new tuning gene.

6. The tuning method of claim 5, wherein, in the regenerating of the second number of tuning genes, for each in a plurality of sub-tuning genes included in the first number of tuning genes, a mutation probability for a lower bit of a sub-tuning gene is set higher than a mutation probability for an upper bit of a sub-tuning gene, which is higher than the lower bit.

7. The tuning method of claim 1, wherein in calculating the accuracies, the accuracies are calculated based on a pressure plate maximum temperature, a pressure plate cooling curve, a flywheel maximum temperature, and a flywheel cooling curve.

8. The tuning method of claim 7, wherein calculating the accuracies comprises: calculating an accuracy of the clutch temperature estimation model by multiplying an accuracy of the pressure plate maximum temperature, an accuracy of the pressure plate cooling curve, an accuracy of the flywheel maximum temperature, and an accuracy of the flywheel cooling curve and by multiplying a mode weight value.

9. An automatically tuning apparatus without user interference for a clutch temperature estimation model, the automatically tuning apparatus comprising:
    a computing system having a memory and a processor, the computing system having a set of modules stored on the memory and processed by the processor, the modules comprising:
    a tuning value generation module configured to: randomly generate a plurality of first generation tuning genes and calculate a tuning value corresponding to a tuning variable by using information of each first generation tuning gene of the plurality of first generation tuning genes;
    an accuracy calculation module configured to: apply the calculated tuning value to the clutch temperature estimation model, calculate an accuracy of temperature estimation, and extract tuning genes having highest calculated accuracies among the plurality of first generation tuning genes;
    and a recombination module configured to regenerate second generation tuning genes by recombining the extracted first generation tuning genes with highest tuning accuracy,
    wherein
    the recombination module is further configured to: randomly select a number of tuning genes from the extracted first generation tuning genes, extract a tuning gene component for a randomly assigned region for each of the randomly selected number of tuning genes, and generate a new tuning gene by combining the extracted tuning gene components in corresponding regions.

10. The tuning apparatus of claim 9, wherein:
    the tuning value generation module is configured to calculate the tuning value for the second generation tuning genes; and
    the accuracy calculation module is configured to apply the calculated tuning value for the second generation tuning genes to the clutch temperature estimation model, calculate the accuracy of temperature estimation, and extract third generation tuning genes with highest accuracies among the first generation tuning genes and the second generation tuning genes.

11. The tuning apparatus of claim 10, wherein the recombination module is configured to recombine the extracted third generation tuning genes to regenerate fourth generation tuning genes.

12. The tuning apparatus of claim 9, wherein the recombination module is configured to regenerate a post-mutation tuning gene by setting a mutation probability for each chromosome in the new tuning gene.

13. The tuning apparatus of claim 12, wherein, for each in a plurality of sub-tuning genes included in the first generation tuning genes, a mutation probability for a lower bit of a sub-tuning gene is set higher than a mutation probability for an upper bit of a sub-tuning gene, which is higher than the lower bit.

14. The tuning apparatus of claim 9, wherein the accuracy calculation module is configured to calculate the tuning accuracies based on accuracies of a pressure plate maximum temperature, a pressure plate cooling curve, a flywheel maximum temperature, and a flywheel cooling curve.

15. The tuning apparatus of claim 14, wherein the accuracy calculation module is configured to calculate an accuracy of the clutch temperature estimation model by multiplying an accuracy of the pressure plate maximum temperature, an accuracy of the pressure plate cooling curve, an accuracy of the flywheel maximum temperature, and an accuracy of the flywheel cooling curve and by multiplying a mode weight value.

* * * * *